Feb. 8, 1949. V. BUSH 2,461,032
THERMAL APPARATUS FOR COMPRESSING GASES
Filed Jan. 31, 1944
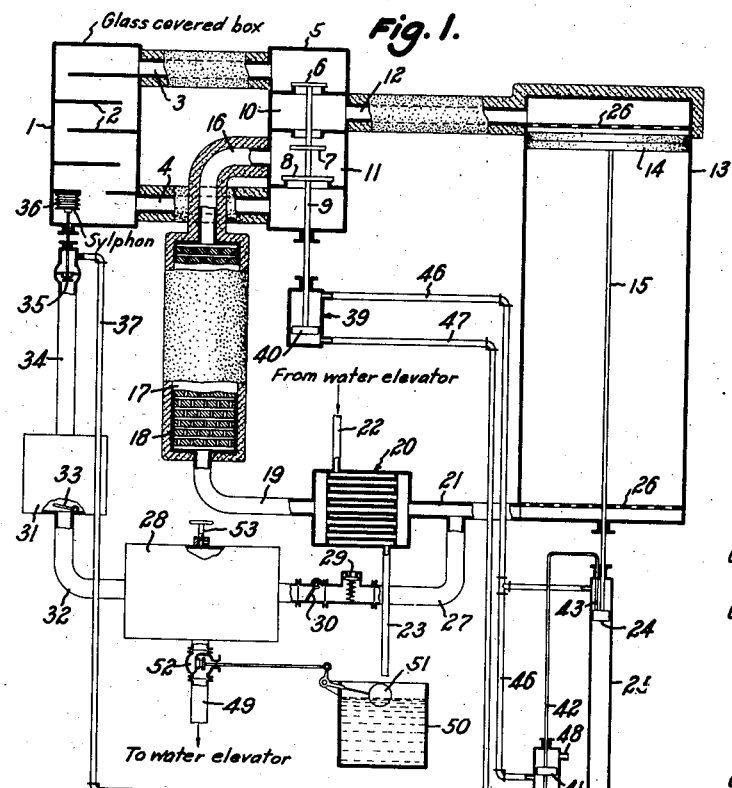
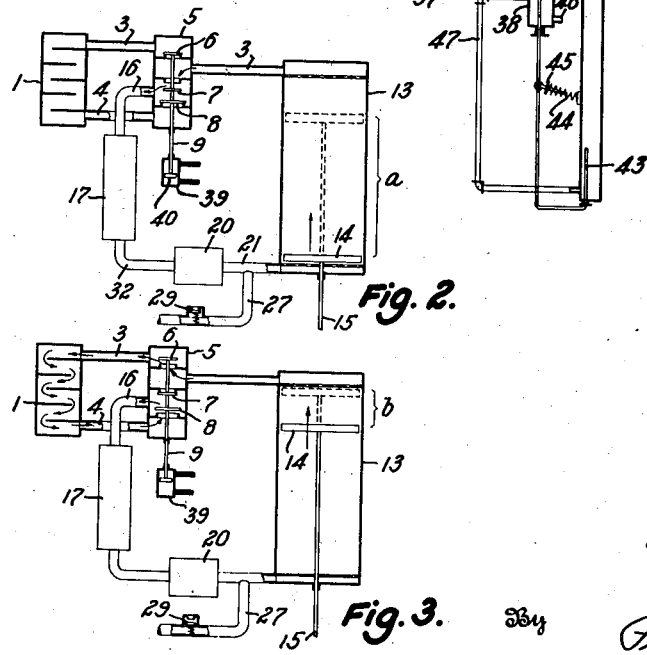
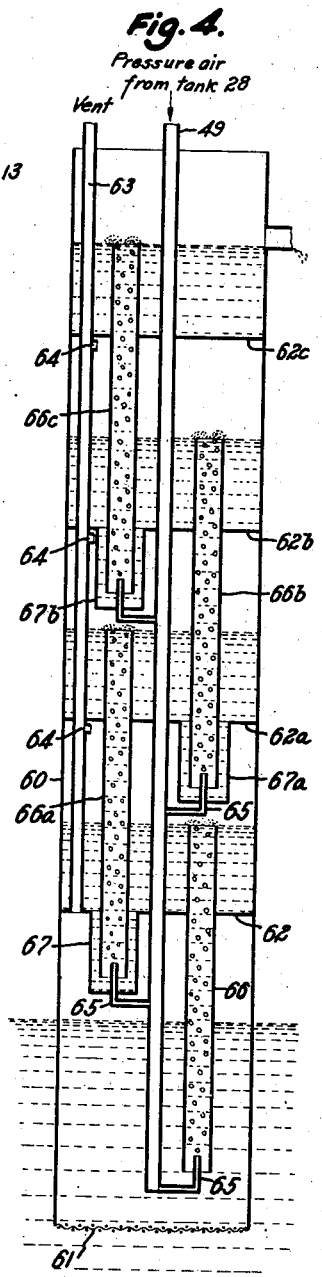
Inventor:
Vannevar Bush,
By Pierce + Scheffler
Attorneys.

Patented Feb. 8, 1949

2,461,032

UNITED STATES PATENT OFFICE 2,461,032

THERMAL APPARATUS FOR COMPRESSING GASES

Vannevar Bush, East Jaffrey, N. H.

Application January 31, 1944, Serial No. 520,501

18 Claims. (Cl. 230—1)

This invention relates to thermal apparatus for compressing gases, and more particularly to apparatus by which the heat of the sun can be used directly to compress air to moderate or low pressures for the operation of water pumps for irrigation and other farm and household uses.

The novel apparatus operates by the alternate heating and cooling of a constant volume of gas in a closed system having valves for admitting gas thereto and discharging gas therefrom at predetermined pressure conditions, and transforms heat energy into the potential energy of compressed gas without the interposition of mechanical power. Apparatus of this character has been termed a "direct thermal compressor" in my prior Patent 2,157,229, granted May 9, 1939, which describes a closed system comprising a cylinder having a heated lower end and a cooled upper end, a piston movable in the cylinder to transfer the gas back and forth from one end of the cylinder to the other through a regenerator, and inlet and outlet connections to the cooled end of the cylinder, these connections being provided with check valves that open to admit gas to the closed system when the pressure therein drops below a selected value and to discharge gas from the closed system to a storage tank when the pressure rises above the storage tank pressure. The direct thermal compressor of this invention has, in general, these same operating characteristics but the apparatus includes a number of novel features or elements that contribute to efficient operation in the compression of gas to moderate values, for example to about 10 pounds per square inch, by heat energy developed by a large capacity but moderately high temperature source such as a "hot box" heated by solar radiation.

The invention will be described as embodied in a water pumping system in which air is the gaseous medium of the heat engine but it is to be understood that other gases may be compressed for the operation of fluid pressure motors or for other purposes. The fixed volume of gas, which for convenience of description will be assumed to be air, is alternately heated and cooled by displacement in opposite directions through a cooler in series with a regenerator, and the heat energy for operating the apparatus is introduced by passing a part of the moving body of air to the regenerator through a heat zone (that is, a solar-heated box in the embodiment herein illustrated) during the step of cooling the air to reduce its pressure. The mechanical power for displacing the air in opposite directions through the heat transfer regions of the regenerator and cooler is developed by air drawn from the pressure tank and the volume of pressure air in excess of that required for operation of the system constitutes the useful output that is available for operating water elevators of the air lift type or for other purposes. The water pump application of the heat engine is particularly efficient as the pumped water constitutes the cooling medium of the heat engine. Objects of the invention are to provide heat engines of efficient and relatively simple constructions for the direct compression of gases, and water pumping systems including heat engines powered by solar radiation. An object is to provide a solar heat engine system for compressing gas or air in a storage tank. Another object is to provide a heat engine—compressor system including a pressure tank for the storage of compressed air for actuating an intermittently operated apparatus, the pressure tank having a leak opening for wasting pressure air to preclude a blocking of operation when the apparatus is idle for some time. Another object is to provide a solar heat engine compressor system including a pressure tank for the storage of compressed air and an auxiliary tank for retaining air under pressure to start the system after an over-night shutdown.

These and other objects and advantages of the invention will be apparent from the following specification when taken with the accompanying drawings in which:

Fig. 1 is a fragmentary and schematic diagram of a solar water pump embodying the invention;

Figs. 2 and 3 are fragmentary schematic views showing the relative positions of the major elements of the apparatus at different stages in the cooling portion of a cycle of operation; and Fig. 4 is a diagrammatic view, in section, of a cascaded air lift water elevator that may be incorporated in the solar water pump of Fig. 1.

In the drawings, the reference numeral 1 identifies a hot box that is a collector of the sun's radiant heat. It comprises an insulated shallow box, inclined to the south, that is covered by three or four layers of glass or equivalent transparent material that is preferably treated to cut down reflection losses. The interior of the box is painted black to promote heat absorption, and baffles 2 are provided within the box to establish a tortuous path between a pair of openings. Under optimum conditions such a box will develop an internal temperature approximating 800° F. on a clear day when there is no appreciable air circulation, and practical operation of the apparatus is obtained at much lower internal temperatures. The opposite ends of the tortuous passage are connected through insulated pipes 3, 4 to the end compartments of the casing 5 of a main valve having a plurality of valves 6, 7, 8 on a valve stem 9 for controlling communication between the respective end compartments and the intermediate compartments 10, 11 on opposite sides of the intermediate valve 7.

An insulated pipe 12 extends from the valve compartment 10 to the upper end of a cylinder 13 in which a piston 14 is carried by piston rod 15 for reciprocating movement. Insulated pipe 16 extends from the valve compartment 11 to the upper, hot end of a regenerator comprising an insulated cylinder 17 that is filled with perforated, thin metal disks 18. The lower, relatively cool end of the regenerator is connected to the lower end of the cylinder 13 through pipe 19, the cooler 20 and pipe 21. The cooler 20 is a heat exchange device in which the air flows through tubes surrounded by a cooling medium entering at pipe 22 and exhausting through pipe 23.

The piston rod 15 has, at its lower end, a piston 24 that is movable in a cylinder 25 of substantially smaller diameter than that of the cylinder 13, for example about one-tenth the diameter of the larger cylinder. As will be described later, pressure air is admitted to the cylinder 25 to reciprocate the piston 24 and thereby the piston 14 of the cylinder 13. The cylinder 13 and piston 14 may be of relatively light construction as the pressure difference between opposite sides of the piston 14 is merely that due to the friction of air movement in the closed air system. The piston 14 may have light skirts of heat resistant material, as illustrated, and the cylinder 13 may be and preferably is graphited to reduce friction. The ends or heads of the cylinder 13 are so shaped and provided with means, such as perforated plates 26, that the entrance and exit of air occurs substantially uniformly over the entire cross-section of the cylinder.

A pipe 27 extends from the pipe 21, which connects the lower end of the cylinder 13 to the cooler 20, to a pressure storage tank 28, and check valves 29, 30 are provided on pipe 27 to admit air to the closed system when the pressure therein falls below atmospheric and to discharge pressure air from the closed system to the tank 28 when the pressure of the air in the closed system rises above the pressure within the tank 28. An auxiliary tank 31 is connected to the pressure tank 28 through a pipe 32 and a check valve 33 that seats to retain pressure air within the auxiliary tank 31 for initiating operation of the apparatus after an over-night shutdown.

Pressure air for operating the reciprocating motor 24, 25 flows from the auxiliary tank 31 through pipe 34 and a valve 35 that is controlled by a thermostatic device, for example a bellows 36 within the hot box 1. Pressure air pipe 37 extends from the thermally controlled valve 35 to the casing 38 of a trip valve that controls the flow of pressure air to and from a cylinder 39 at opposite sides of a piston 40 on the lower end of the stem 9 of the main valve 5—11, and to the opposite ends of the cylinder 25 of the air motor that drives the piston 14. The trip valve may be of a simple construction such as employed in windshield wipers and, as shown diagrammatically in Fig. 1, comprises a pair of pistons or valve disks 41 on a rod 42 with inturned ends 43 that extend into opposite ends of the cylinder 25 for direct actuation by the piston 24 as it nears the ends of its stroke. A spring 44 presses upon a rocking seat 45 on the rod 42 to provide a toggle that retains the valve rod in either of its end positions until it is positively moved by the piston 24 to carry the toggle "past center," and the spring 44 then snaps the rod 42 quickly to its other end position. The pressure supply pipe 37 opens into the central part of the trip valve casing 38 between the valve disks 41, and the pipe connections 46, 47 from the top and the bottom, respectively, of the motor cylinders 25 and 39 open into the valve casing 38 at points so spaced that the displacement of the valve disks connects the pipes 46 and 47 in alternation to the pressure space between the valve disks and to end spaces of the valve casing that are open to atmosphere at ports 48.

As indicated by the legends of Fig. 1, the ultimate load of the heat engine is a water elevator operated by compressed air that flows from storage tank 28 through pipe 49, and a part or all of the pumped water serves as the cooling medium for the heat exchanger 20 of the heat engine, the cooling water being discharged from the outlet pipe 23 into a storage tank 50. A float 51 in tank 50 closes the valve 52 in the pressure air pipe 49 to shut down the water elevator when the water storage tank is filled. The pressure air tank 28 is preferably provided with an adjustable air vent 53 to prevent a blocking of operation when there is a relatively low demand for water.

All parts are not shown to scale or in the most desirable relative positions in the Fig. 1 diagram but some of the illustrated relationships are important. It is desirable, when limitations as to available space permit, to arrange the main cylinder 13 and the air motor cylinder 25 on a vertical axis with the air motor below the cylinder 13. The lower surface of the air motor piston 24 is of larger area than the upper surface, due to the diameter of the piston rod 15, and a proper relation of dimensions to operating pressures provides a counterbalance for a part or all of the weight of the moving system that results in approximately equal speeds in the two directions of movement. The diameter of the air motor cylinder 25 is substantially less than that of the main cylinder 13 and may be, as shown, about one-tenth the diameter of the main cylinder. Attention is directed to the fact that valve 8 of the main valve assembly is substantially larger than valve 6. The reason for this dimensional relationship will be apparent from the following description of operation.

The moving elements are illustrated in Fig. 1 in the positions that they occupy when the piston 24 of the reciprocating air motor has reached its top position and has shifted the trip valve disks 41 to supply pressure air to the upper ends of the air motor cylinders 25 and 39. The piston 24 is about to start its downward movement in cylinder 25, but the piston 40 has already reached its lower position and has shifted the main valve stem 9 downwardly to adjust valves 6, 7, 8 into the illustrated position. The down stroke of the piston 40 takes place in the short interval during which the piston 24 and associated elements came to rest at the end of the upward stroke of the piston 24.

Assuming that the apparatus has been in operation for some time, the air within the box 1 is at a high temperature, the regenerator 17 is heated and there is a thermal gradient along the reair compressor assembly may advantageously be designed to compress about 50 cubic feet of air per minute. If the assembly is applied to the lifting of water 100 feet in a ten stage lift wherein the volume of water pumped per stage is approximately equal to the volume of air, about 5 cubic feet per minute, or 2500 gallons of water per hour, should be pumped to the higher level.

The invention is not limited to the particular constructions herein shown and described, and it is to be understood that changes may be made in the various parts and in their relative dimensions and arrangements without departing from the spirit of my invention as set forth in the following claims.

I claim:

1. A direct thermal compressor of the type including a cylinder having a piston therein, passage means connecting the opposite ends of said cylinder and comprising a cooler in series with a regenerator, means for reciprocating said piston to transfer gas back and forth through said passage means in repeated cycles, and heating means to establish and maintain a temperature gradient along said regenerator, characterized by the fact that said heating means comprises a gas-filled closed box exposed to solar radiations, and conduit means for passing solar-heated gas from said closed box in heat exchange relation to said regenerator.

2. In a direct thermal compressor, the invention as recited in claim 1, wherein said conduit means is connected to said passage means, whereby gas heated in said closed box joins with the gas in transit between the ends of said cylinder.

3. In a direct thermal compressor, the invention as recited in claim 1, wherein said conduit means includes valve means for connecting the closed box to said passage means adjacent the hotter end of said regenerator.

4. In a direct thermal compressor for compressing a gas, the combination with a cylinder having a piston movable therein; a substantially closed conduit system connected between the opposite ends of said cylinder; said conduit system including in series a cooler connected to one end of said cylinder and a regenerator, and a heated passage; check valves for admitting gas to said end of the cylinder when the pressure within the conduit system drops below a selected value and for discharging compressed gas therefrom when the pressure exceeds a higher selected value; and means for reciprocating said piston to displace the gas in opposite directions through said conduit system; of valve means in said conduit system for completing a path of gas flow directly between said regenerator and the other end of said cylinder or alternatively for including said heated passage in the path of gas flow between said regenerator and the other end of said cylinder.

5. In a direct thermal compressor, the invention as recited in claim 4, wherein said valve means includes means responsive to the pressure within said closed conduit system for including said heated passage in the path of gas flow to the regenerator when the pressure within the closed conduit system drops below a preselected value.

6. In a direct thermal compressor, the invention as recited in claim 4, in combination with means for actuating said valve means to exclude the heated passage from the path of gas flow during movement of the piston to displace gas from the cooler end to the regenerator end of the cylinder and to bias said valve means towards adjustment in the opposite sense upon a reversal of the movement of the piston, said valve means including means for delaying said adjustment of the valve means until the pressure within the closed system drops below a preselected value.

7. In a direct thermal compressor, the invention as recited in claim 4, wherein said valve means comprises a casing having apertured partitions therein defining compartments connected to the opposite ends of said heated passage and compartments connected respectively to the regenerator and said other end of the cylinder, and a plurality of connected valves controlling flow through the apertures of said partitions, the valve controlling flow between the regenerator and said passage being of larger size than the valve controlling flow between the cylinder end and said passage.

8. In a direct thermal compressor, the invention as recited in claim 4, in combination with a gas storage tank connected to said closed conduit system through that check valve which opens to discharge compressed gas from the closed conduit system, an auxiliary tank connected to said gas storage tank, and a pipe connection from said auxiliary tank to said means for reciprocating the piston, said reciprocating means being a motor operable by compressed gas.

9. In a direct thermal compressor, the invention as recited in claim 4, in combination with a gas storage tank connected to said closed conduit system through that check valve which opens to discharge compressed gas from the closed conduit system, an auxiliary tank connected to said gas storage tank, a pipe connection from said auxiliary tank to said means for reciprocating the piston, said reciprocating means being a motor operable by compressed gas, and means responsive to the temperature of said heated passage for closing said pipe connection when the temperature of the heated passage falls below a selected value.

10. In a direct thermal compressor, the invention as recited in claim 4, wherein said heated passage comprises a tortuous passage in a closed box exposed to solar radiation.

11. In a direct thermal compressor, the invention as recited in claim 4, in combination with a gas storage tank connected to said closed conduit system through that check valve which opens to discharge compressed gas from said closed conduit system, thereby to transfer gas from the closed conduit system to the tank when the pressure within the closed system exceeds the pressure within the tank, and a vent for bleeding pressure from said storage tank.

12. In a direct thermal compressor, the combination with a cylinder having a piston movable therein, a passage including a cooler and a regenerator connecting the opposite ends of the cylinder, means for reciprocating said piston to displace the gas back and forth between said cylinder ends through said passage, a gas inlet to and a gas outlet for the end of said cylinder adjacent the cooler, and check valves controlling gas flow through said inlet and outlet in accordance with the gas pressure within said cylinder, of a source of heat energy, and valve means responsive to the pressure within said cylinder for passing the gas in heat-exchange relation to said heat energy source during displacement from the cylinder to the regenerator and then to the cooler, thereby to increase the heat energy stored in the regenerator.

generator from its hot upper end to its cooler lower end, and the air within the cylinder 13 is relatively cool and at substantially atmospheric pressure. The piston 14 is forced down by the air motor 24, 25 to transfer air from the lower to the upper end of the cylinder 13 through the regenerator 17. The air is heated as it flows through the regenerator, and the pressure rises within the cylinder 13 as the piston 14 moves downwardly. When the cylinder pressure rises above the pressure within the storage tank 28, the check valve 30 opens and air flows from the closed system into the storage tank 28 during the final portion of the down stroke of the piston 14.

The trip valve disks 41 are shifted at the end of the down stroke of the air motor piston 41, and pressure air then enters the lower end of the cylinder 25 to move the motor piston 24 and the air-displacing piston 14 upwardly. Pressure air is simultaneously admitted to the lower end of the air motor cylinder 39 and tends to lift the moving valve assembly 6—9 of the main valve. The relatively high pressure within the chambers 10, 11 of the main valve casing prevents this lifting of the movable valve assembly as the area of valve 8 is substantially greater than the area of valve 6. The path of air flow during a substantial portion a, see Fig. 2, of the upward movement of the piston 14 is therefore identical, but with the air moving in the reverse direction, to the path of air flow during the downward movement of the piston 14. The air is cooled as it flows through the heat exchanger 20, and the pressure within the cylinder 13 falls. When the pressure has dropped nearly to atmospheric, the pressure on piston 40 exceeds the differential pressure on valves 6, 8, and the main valve is shifted to its upper position, see Fig. 3, to include the hot box 1 in the path of air flow during the portion b of the upward movement of the piston 14. Heat energy is transferred to the regenerator 17 during this portion of the cycle but the pressure within the cylinder continues to fall and the check valve 29 opens to admit additional air to the cylinder. The next down stroke of piston 14 forces some or all of the added air into the storage tank 28 and compressed air, at from about 5 to 10 pounds gage pressure, is there available for the operation of water pumping systems or other uses.

The system is automatically shut down at night or under adverse weather conditions when the air temperature within the hot box 1 drops below the selected value at which the thermostatic control device 36 opens the valve 35. On restarting with the regenerator 17 cold, the cylinder pressure does not rise when the piston 14 is moved downwardly by the air motor 24, 25 to transfer the air from below to above the piston 14. The main valve assembly 6—8 therefore is lifted promptly at the end of each down stroke of piston 14 and, for the first few up strokes of piston 14, the entire air flow is through the hot box 1 and heat is transferred to the regenerator 17. As the regenerator heats up, the shifting of the main valve is progressively delayed until a balanced condition is reached at which normal operation of the main valve takes place after the piston 14 moves upwardly through the range a, Fig. 2.

A special case arises when no air is being drawn for use from the air storage tank 28. Flow to the tank 28 ceases when the pressure within the tank rises to the maximum pressure established within the cylinder 13. The main valve may cease to operate under such conditions as the cylinder pressure does not drop to approximately atmospheric, and the regenerator gradually cools down when heat is not supplied from the hot box 1. This may result in difficulty since, when air is again used from the tank 28, the operation may not again start even though the tank pressure drops considerably. Operation could be started by manually opening a valve to drop the tank pressure to zero but, to avoid such manual adjustment, the tank 28 is preferably provided with the adjustable leak valve 53 to insure a periodic transfer of air to the tank and thereby a dropping of the pressure in the cylinder 13, to shift the main valve to supply additional heat periodically to the regenerator 17 from the hot box 1.

The moderate pressure produced in the air storage tank 28, i. e. a pressure of the order of five or ten pounds per square inch, may be usefully employed for other purposes but a water pumping system of the air lift type is a novel and particularly efficient combination of a solar-energized air compressor and pressure-operated load device. The water is at a relatively low temperature, whether drawn from below ground or from a pond or stream, and its use in the heat exchanger 20 eliminates the expense of a special cooling medium for the heat engine. The water may be raised a relatively short distance with a single stage air lift for irrigation purposes or, for a given heat engine-air compressor assembly, a smaller volume of water may be raised through considerable distances for household or other use by cascaded air lift units. Good design of the air lift affords efficiencies of up to about 70%, and the moderate air pressures produced at the air storage tank 28 are adequate for relatively efficient operation.

The water pumping equipment of Fig. 1 is appropriate for a household water system in which water is lifted from some sub-surface level to a water storage tank 50 in the attic of a house by a cascaded air lift such as illustrated in Fig. 4. The air lift is constructed within a pipe casing 60 that may be lowered into an open well or into a larger casing, not shown, that extends below the water level in a well or is driven into the ground below the water level. A filter or screen 61 is preferably arranged at the lower end of the pipe casing 60, and partitions 62, 62a, 62b extend across the pipe casing 60 to provide a plurality of air lift stages that are each vented to atmosphere by a pipe 63 that extends through the several partitions and has ports 64 below the partitions 62a, 62b, etc. The pressure air pipe 49 from the air storage tank 28 extends through the several partitions and has nozzles 65 that open into the air lift pipes 66—66c of the several stages of the cascaded air lift water elevator. The lower end of the air lift pipe 66 extends well below the ground water level, and the lower ends of the pipes 66a, 66b, etc. of the upper stages are located within sumps 67, 67a, 67b that drop below the level of the associated partitions 62, 62a, and 62b. The cascaded air lift is self-regulating as any tendency for one stage to lift water at a more rapid rate than it is removed by the next upper stage will result in a higher hydraulic head against which the lower stage works and a lower lift for the upper stage. These changes in hydraulic head slow down the lower air lift stage and increase the output of the upper air lift stage.

The cascaded air lift may include more stages than are illustrated in Fig. 4. The heat engine- 13. In a direct thermal compressor, a cylinder having a piston movable therein, a passage connecting the opposite ends of said cylinder and including a cooler in series with a regenerator, a pressure storage tank, a pipe connection including a check valve between said tank and the end of said cylinder adjacent the cooler, a check valve for admitting air to said cylinder when the pressure therein drops below a predetermined value, a closed box exposed to solar radiation, and means for passing heated air from said box in heat-exchange relation to said regenerator to establish and maintain a thermal gradient along the same, and means operable by compressed air drawn from said tank for circulating a cooling medium through said cooler.

14. In a direct thermal compressor, the combination with a cylinder having a piston movable therein, and a passage connecting the opposite ends of said cylinder and including a cooler in series with a regenerator, of a pressure storage tank, a pipe connection including a check valve between said tank and the end of said cylinder adjacent the cooler, a check valve for admitting air to said cylinder when the pressure therein drops below a predetermined value, a closed box exposed to solar radiation, and means for passing heated air from said box in heat-exchange relation to said regenerator to establish and maintain a thermal gradient along the same, and a water pump operated by compressed air drawn from said tank for circulating cooling water through said cooler.

15. In a direct thermal compressor, the combination with a closed system including a cylinder having a piston movable therein, of a passage connecting the opposite ends of said cylinder and including a cooler in series with a heat source, a pressure storage tank, a pipe connection including a check valve between said tank and the end of said cylinder adjacent the cooler, a check valve for admitting air to said closed system when the pressure therein drops below atmospheric, and a water pump of the air lift type operated by compressed air drawn from said tank for circulating cooling water through said cooler.

16. In a direct thermal compressor, a cylinder having a piston movable therein, a passage connecting the opposite ends of said cylinder and including a cooler in series with a heat source, a pressure storage tank, a pipe connection including a check valve between said tank and the end of said cylinder adjacent the cooler, a check valve for admitting air to said cylinder when the pressure therein drops below atmospheric, a water storage tank, a water pump for delivering water to said water storage tank, said water pump being connected to said water storage tank through said cooler, a pipe connection for supplying compressed air from said pressure storage tank to said water pump to operate the same, and means for closing said pipe connections to said water pump when the water in said water storage tank rises to a preselected level.

17. In a direct thermal compressor, a cylinder having a piston movable therein, a passage connecting the opposite ends of said cylinder and including a cooler in series with a heat source, a pressure storage tank, a pipe connection including a check valve between said tank and the end of said cylinder adjacent the cooler, a check valve for admitting air to said cylinder when the pressure therein drops below atmosphere, a water storage tank, a water pump for delivering water to said water storage tank, said water pump being connected to said water storage tank through said cooler, a pipe connection for supplying compressed air from said tank to said water pump to operate the same, means for closing said pipe connection to the water pump when the water in said water storage tank rises to a preselected level, and a vent on said pressure storage tank for bleeding air therefrom.

18. A solar water pumping system comprising a direct thermal compressor having a hot box exposed to solar radiations and connected through a regenerator and a cooler to the opposite ends of a cylinder in which a piston reciprocates, a pressure storage tank in which air is compressed by said thermal compressor, a water pump of the air lift type operated by air drawn from said tank, and means for passing water from said pump through said cooler as the cooling medium thereof.

VANNEVAR BUSH.

REFERENCES CITED

The following references are of record in the file of this patent:

UNITED STATES PATENTS

| Number | Name | Date |
|---|---|---|
| 538,068 | Denney | Apr. 23, 1895 |
| 776,106 | Beurrier | Nov. 29, 1904 |
| 957,086 | Pelletier | May 3, 1910 |
| 2,157,229 | Bush | May 9, 1939 |